United States Patent
Ho

(10) Patent No.: US 10,167,935 B2
(45) Date of Patent: Jan. 1, 2019

(54) AUTOMATIC TORQUE REGULATING SYSTEM WITH ENLARGING FUNCTION

(71) Applicant: Fu-Hung Ho, Taichung (TW)

(72) Inventor: Fu-Hung Ho, Taichung (TW)

( * ) Notice: Subject to any disclaimer, the term of this patent is extended or adjusted under 35 U.S.C. 154(b) by 193 days.

(21) Appl. No.: 15/402,263

(22) Filed: Jan. 10, 2017

(65) Prior Publication Data

US 2018/0195592 A1     Jul. 12, 2018

(51) Int. Cl.
*F16H 35/10* (2006.01)
*F16H 37/12* (2006.01)

(52) U.S. Cl.
CPC .......... *F16H 35/10* (2013.01); *F16H 37/124* (2013.01)

(58) Field of Classification Search
CPC .......... F16H 15/40; F16H 35/10; F16H 37/12; F16H 37/124; F16H 2057/126; F16H 2057/127; B62M 11/12
USPC .............................. 74/22 R, 337, 337.5, 399
See application file for complete search history.

(56) References Cited

U.S. PATENT DOCUMENTS

| | | | | |
|---|---|---|---|---|
| 2,306,158 A | * | 12/1942 | Ferguson | F16H 9/04 192/103 B |
| 2,513,217 A | * | 6/1950 | Tomlines | F16H 57/12 74/409 |
| 3,548,672 A | * | 12/1970 | Conrad | F16H 37/00 74/10.8 |
| 4,318,334 A | * | 3/1982 | Nelson | F01C 20/06 173/8 |
| 5,544,576 A | * | 8/1996 | Kato | B30B 1/261 100/259 |
| 5,544,577 A | * | 8/1996 | Kato | B30B 1/26 100/282 |
| 5,546,822 A | * | 8/1996 | Fowler | F16H 25/04 74/113 |
| 2005/0172741 A1 | * | 8/2005 | Van Der Plas | A01K 5/004 74/336 R |
| 2015/0364269 A1 | * | 12/2015 | Zhang | F16D 7/024 200/400 |

FOREIGN PATENT DOCUMENTS

WO    WO-2015079399 A1 * 6/2015 ............. F16H 15/52

* cited by examiner

*Primary Examiner* — David M Fenstermacher
*Assistant Examiner* — Joseph Brown
(74) *Attorney, Agent, or Firm* — Alan D. Kamrath; Kamrath IP Lawfirm, P.A.

(57) ABSTRACT

An automatic torque regulating system includes a base, a plurality of positioning rods mounted on the base, a first disk mounted on the positioning rods, a second disk moved with the first disk, a hollow bushing sandwiched between the first disk and the second disk and pivotally connected a force input shaft and a force output shaft, a plurality of cams moved in concert with the first disk and the second disk and pressing a conic face of the force output shaft. Thus, when the first disk and the second disk are moved, the cams are moved axially relative to the force output shaft to change different contact points between the cams and the conic face of the force output shaft so as to regulate the torque automatically.

7 Claims, 15 Drawing Sheets

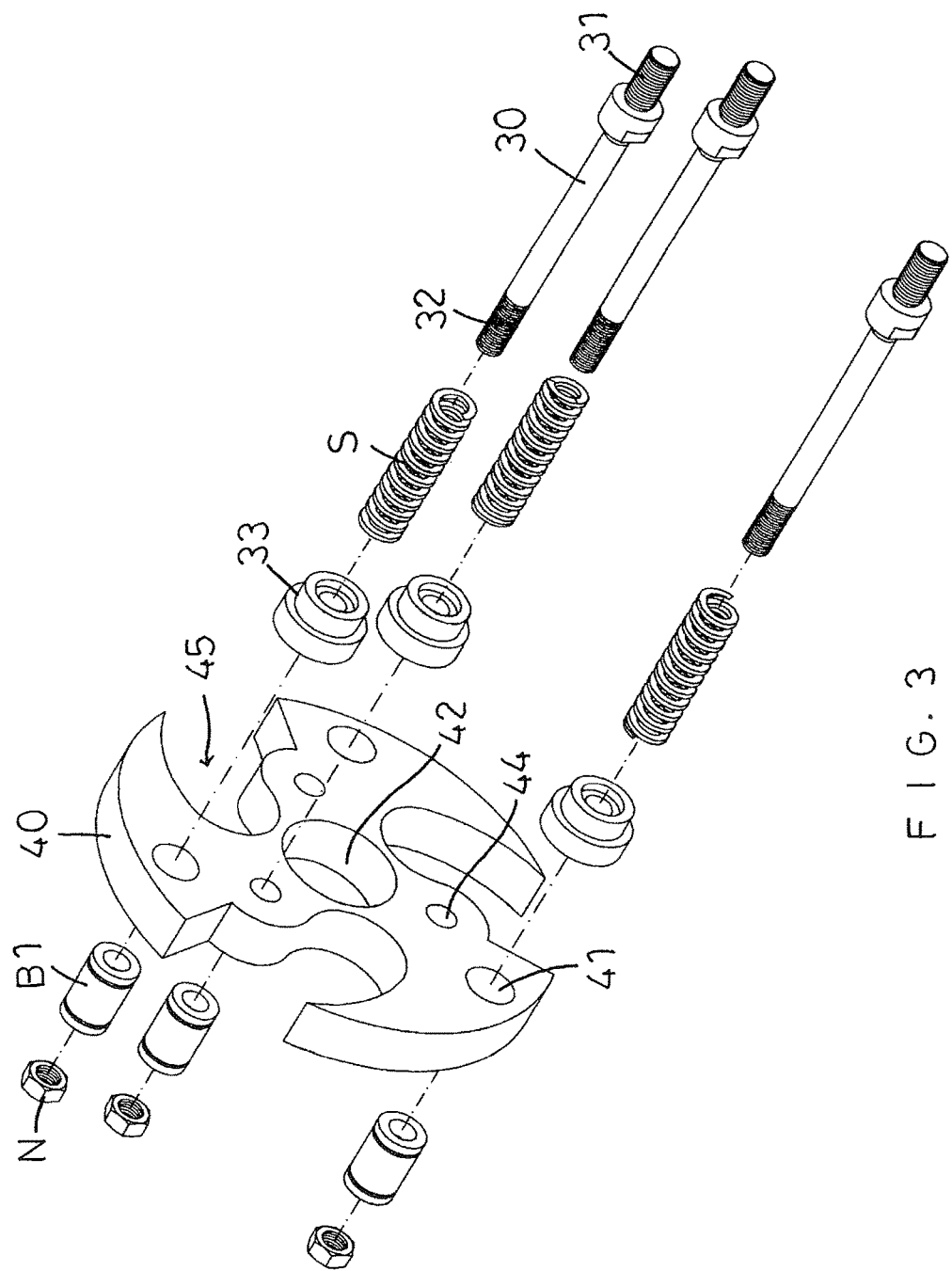
F I G. 3

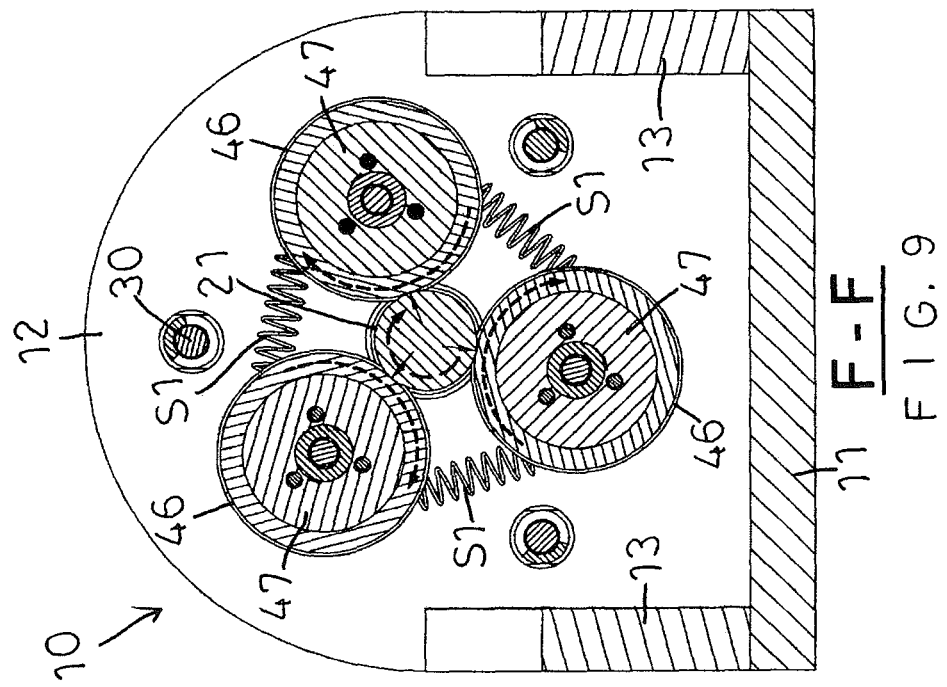
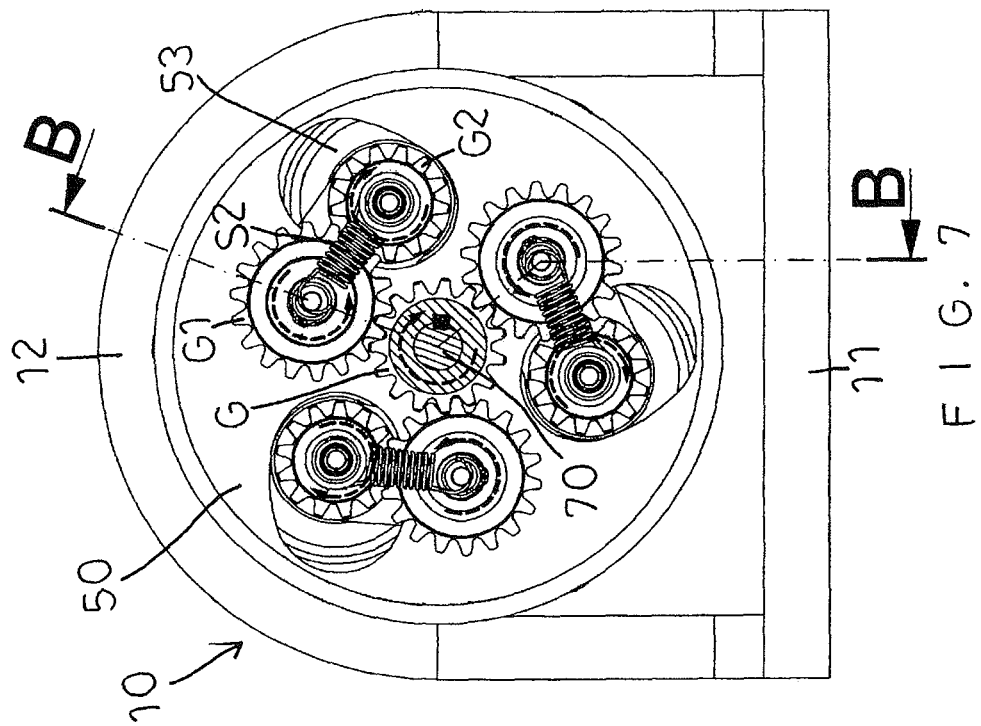

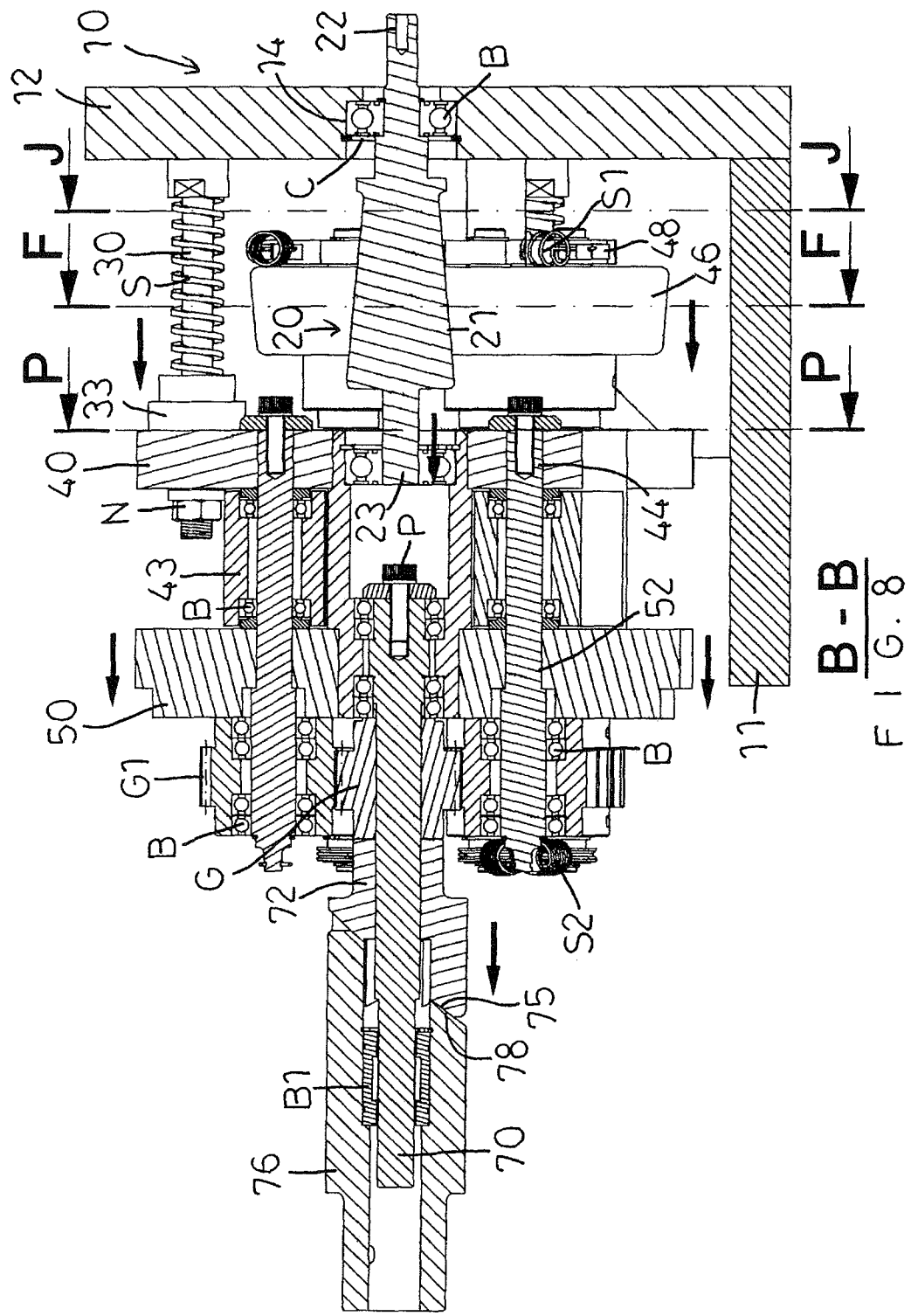

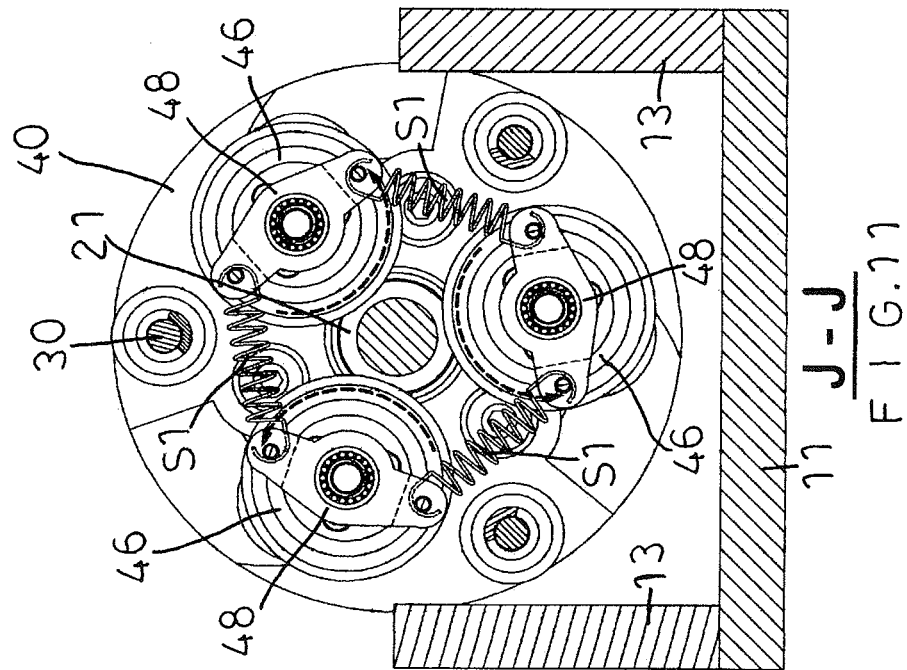
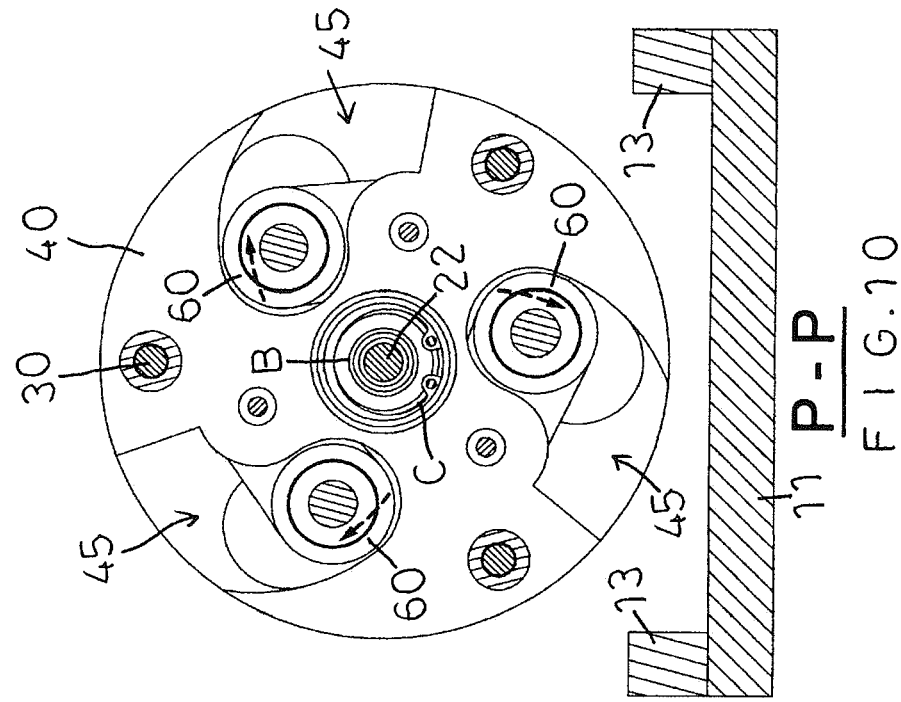

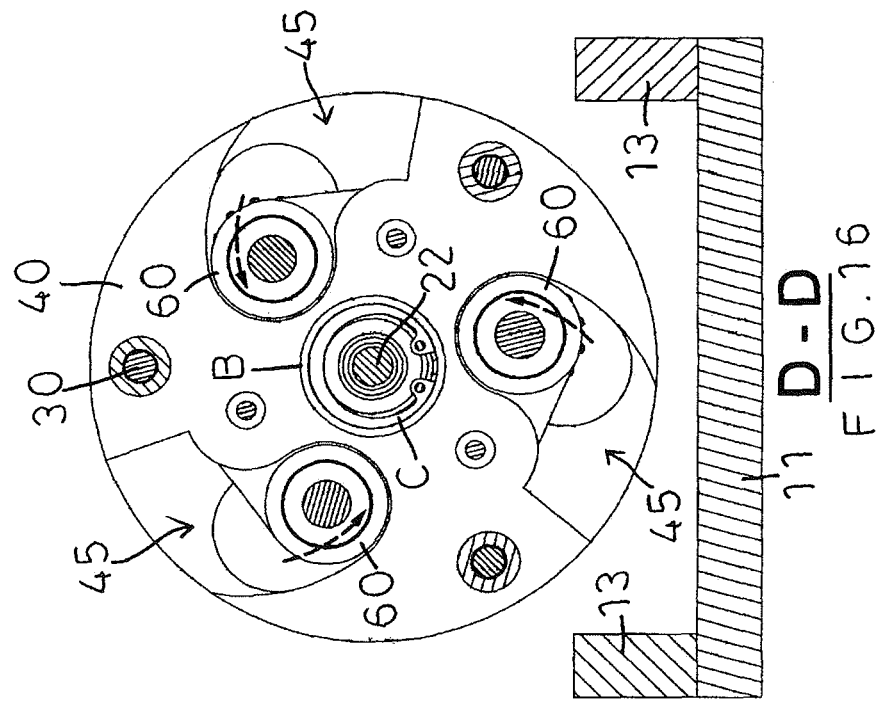
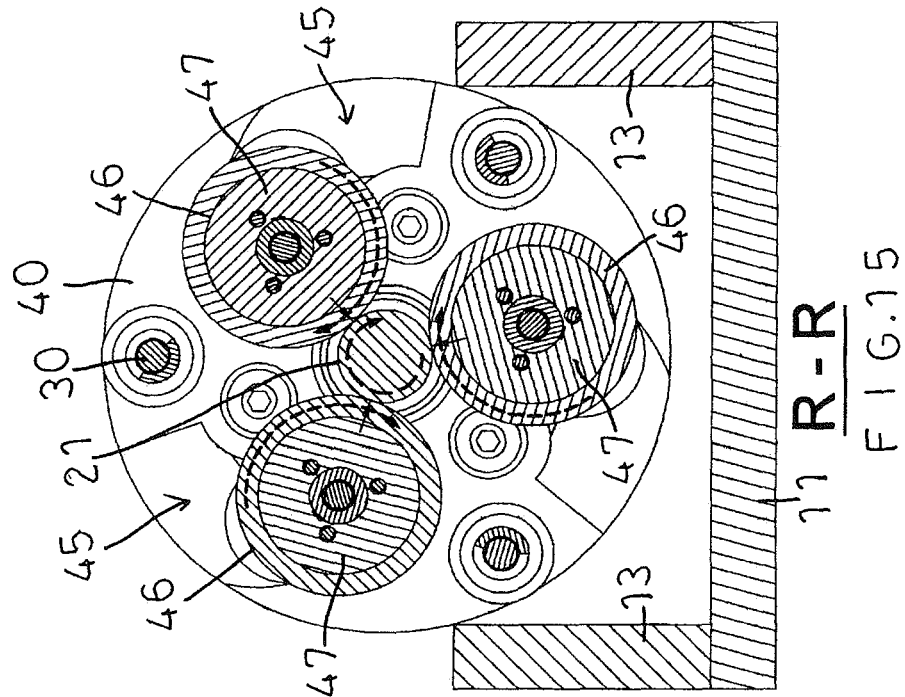

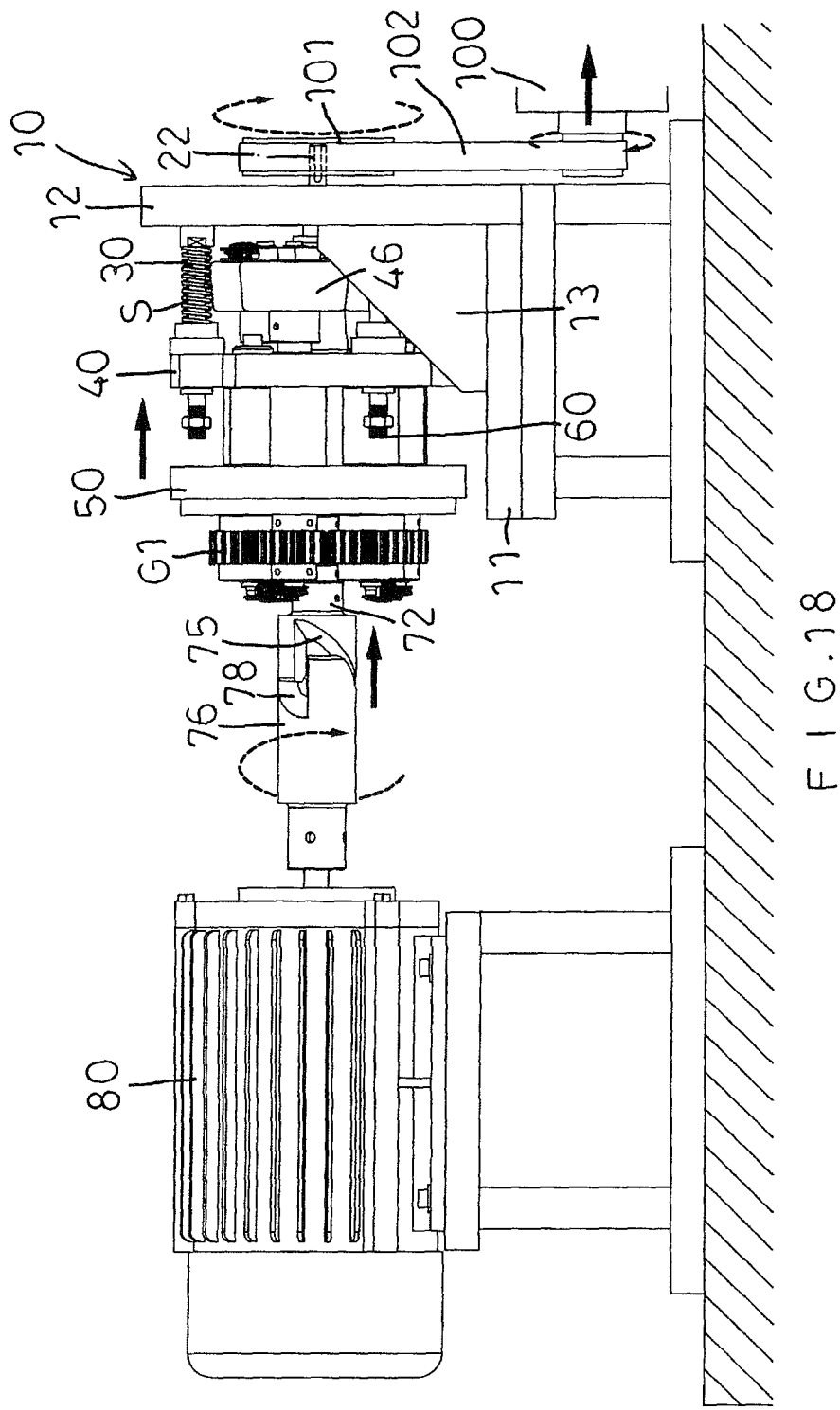

AUTOMATIC TORQUE REGULATING SYSTEM WITH ENLARGING FUNCTION

BACKGROUND OF THE INVENTION

1. Field of the Invention

The present invention relates to a gear system and, more particularly, to an automatic torque regulating system for a generator or an electric car.

2. Description of the Related Art

A conventional generator or electric car comprises a gear system having a force input shaft, a plurality of gears and a force output shaft. In operation, when the generator or electric car produces a load resistance due to an excessive voltage, the force output shaft stops rotating by the load resistance to stop rotation of the force input shaft. However, the gear system does not have a torque regulating function so that the generator or electric car is easily inoperative due to shortage of torque.

BRIEF SUMMARY OF THE INVENTION

The primary objective of the present invention is to provide an automatic torque regulating system with an enlarging function.

In accordance with the present invention, there is provided an automatic torque regulating system comprising a base, a force output shaft, a plurality of positioning rods, a plurality of spring abutments, a plurality of compression springs, a first disk, a second disk, a plurality of driving shafts, a plurality of driven shafts, a plurality of driving gears, a plurality of driven gears, a hollow bushing a plurality of cams, a plurality of swing arms, a plurality of first tension springs, a plurality of second tension springs, a plurality of swinging members, a force input shaft, a driven sleeve, a driving sleeve, and a main drive gear. The base includes a transverse plate and an upright plate. The upright plate has a center provided with a shaft hole, and the force output shaft extends through the shaft hole of the base. The upright plate has a surface provided with a plurality of screw holes, and the positioning rods are locked onto the screw holes of the base. The force output shaft is pivotally connected with the shaft hole of the base. The force output shaft is provided with a conic face. The force output shaft has a first end provided with a force output portion extending through the shaft hole of the base and a second end provided with a connecting portion. Each of the positioning rods has a first end provided with a first thread screwed into one of the screw holes of the base and a second end provided with a second thread locked onto the first disk. Each of the spring abutments is mounted on one of the positioning rods and rests on the first disk. Each of the compression springs is mounted on one of the positioning rods and is biased between one of the spring abutments and one of the positioning rods to push the first disk forward. The first disk is provided with a plurality of through holes aligning with the screw holes of the base, and the positioning rods extend through the through holes of the first disk. The first disk has a center provided with a first shaft hole for mounting the hollow bushing. The first disk is provided with a plurality of first pivot holes pivotally connected with the driving shafts. The first disk is provided with a plurality of arcuate openings allowing passage of the driven shafts. The second disk has a center provided with a second shaft hole for mounting the hollow bushing. The second disk is provided with a plurality of second pivot holes pivotally connected with the driving shafts. The second disk is provided with a plurality of arcuate slots allowing passage of the driven shafts. Each of the driving gears is mounted on one of the driving shafts. Each of the driven gears is locked on one of the driven shafts and meshes with one of the driving gears respectively. The hollow bushing is sandwiched between the first disk and the second disk. The hollow bushing has a front end pivotally connected with the force input shaft and a rear end pivotally connected with the connecting portion of the force output shaft. Each of the cams is locked onto one of the driven shafts and press the conic face of the force output shaft. Each of the cams has a side provided with a mounting seat. Each of the swing arms is pivotally connected with the mounting seat of one of the cams. The first tension springs are biased between the swing arms to force the cams to press the conic face of the force output shaft, so that the conic face of the force output shaft is sandwiched between the cams by the elastic force of the first tension springs. Each of the second tension springs is mounted between one of the driving shafts and one of the driven shafts, so that each of the driven gears is forced to mesh with one of the driving gears constantly by the elastic force of each of the second tension springs. Each of the swinging members is mounted between the first disk and the second disk. Each of the swinging members has a first side provided with a first pivot hole allowing passage of one of the driving shafts and a second side provided with a second pivot hole allowing passage of one of the driven shafts. The driven sleeve is secured on the force input shaft and is provided with two first abutting faces and two first guiding ramps. The driving sleeve is pivotally mounted on the force input shaft and is juxtaposed to the driven sleeve. The driving sleeve is provided with two second abutting faces aligning with the first abutting faces of the driven sleeve and two second guiding ramps aligning with the first guiding ramps of the driven sleeve. The main drive gear is mounted on the force input shaft and meshes with the driving gears.

According to the primary advantage of the present invention, the cams are moved axially relative to the force output shaft to change different contact points between the cams and the conic face of the force output shaft so as to regulate the torque automatically.

According to another advantage of the present invention, the cams are moved relative to the force output shaft to enlarge the torque, thereby preventing the generator or the electric car from being inoperative due to shortage of torque.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 3 is a partially exploded perspective view of the automatic torque regulating system in accordance with the preferred embodiment of the present invention.

FIG. 7 is a side cross-sectional view of the automatic torque regulating system as shown in FIG. 1, wherein the automatic torque regulating system is operated under the normal load.

FIG. 8 is a cross-sectional view of the automatic torque regulating system taken along line B-B as shown in FIG. 7.

FIG. 9 is a cross-sectional view of the automatic torque regulating system taken along line F-F as shown in FIG. 8.

FIG. 10 is a cross-sectional view of the automatic torque regulating system taken along line P-P as shown in FIG. 8.

FIG. 11 is a cross-sectional view of the automatic torque regulating system taken along line J-J as shown in FIG. 8.

FIG. 15 is a cross-sectional view of the automatic torque regulating system taken along line R-R as shown in FIG. 14.

FIG. 16 is a cross-sectional view of the automatic torque regulating system taken along line D-D as shown in FIG. 14.

FIG. 18 is a schematic operational view showing the automatic torque regulating system for an electric car subjected to a resistance.

DETAILED DESCRIPTION OF THE INVENTION

Figure 1:
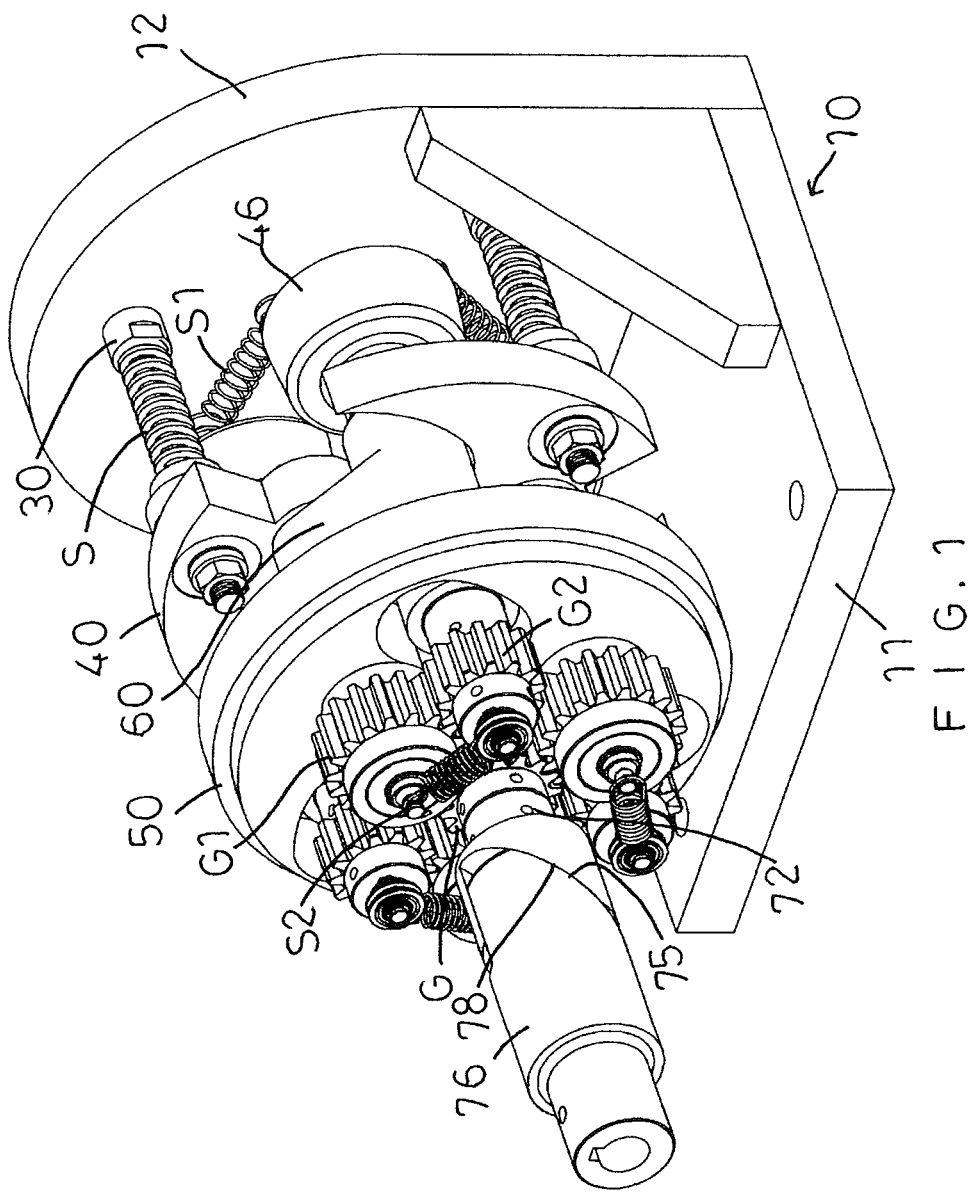
FIG. 1 is a perspective view of an automatic torque regulating system in accordance with the preferred embodiment of the present invention.
Figure 2:
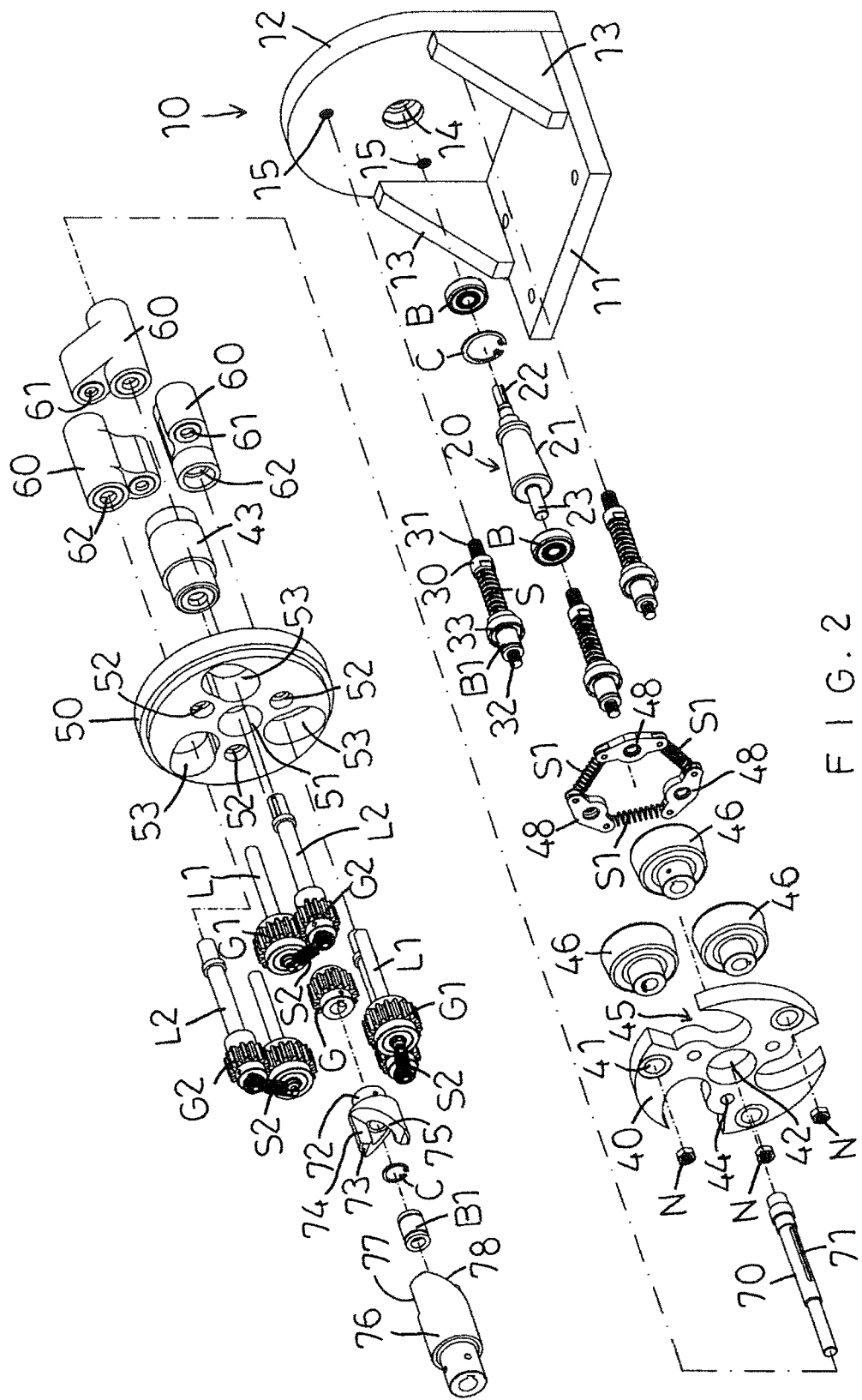
FIG. 2 is an exploded perspective view of the automatic torque regulating system as shown in FIG. 1.
Figure 4:
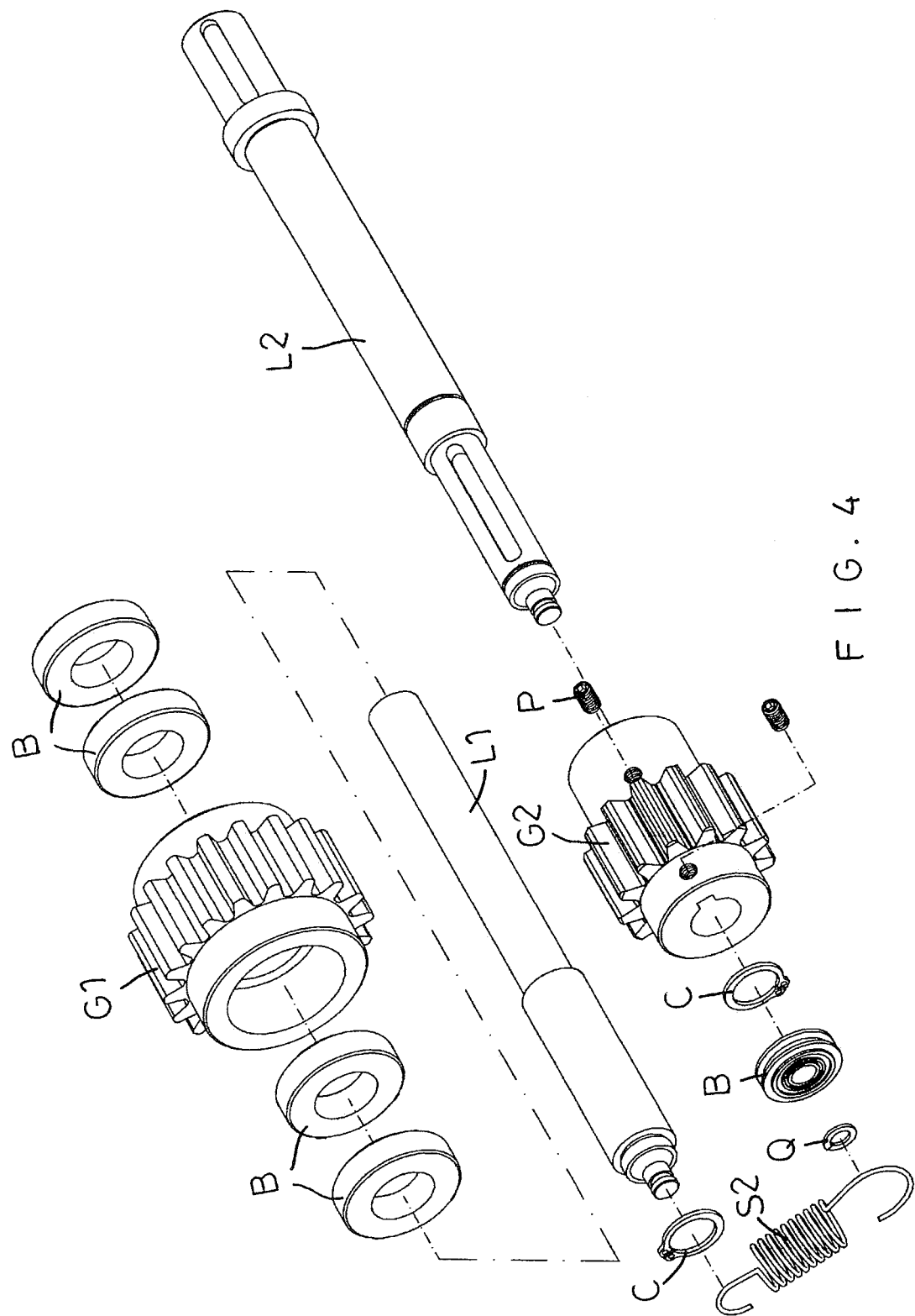
FIG. 4 is a partially exploded perspective view of the automatic torque regulating system in accordance with the preferred embodiment of the present invention.
Figure 5:
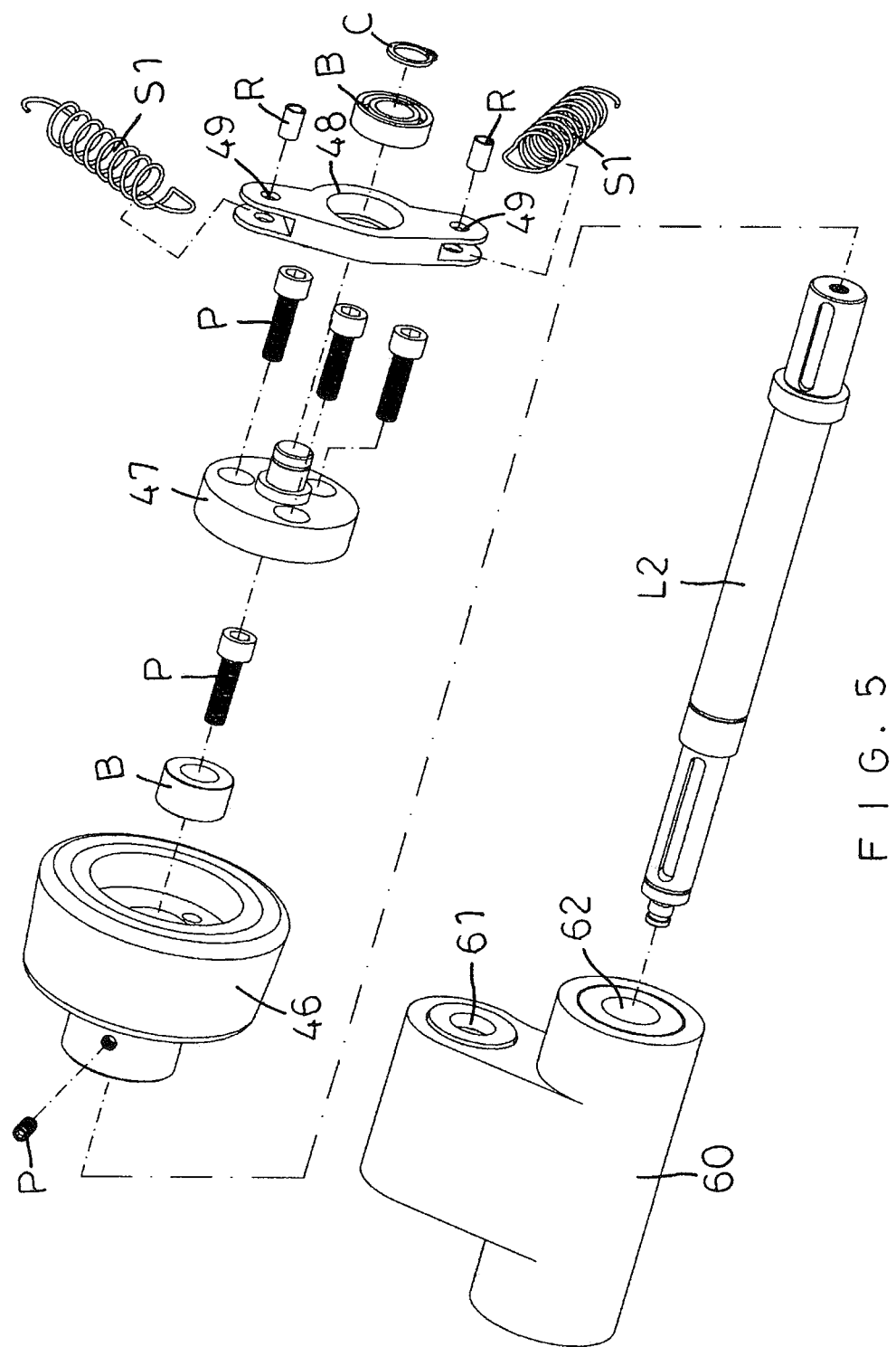
FIG. 5 is a partially exploded perspective view of the automatic torque regulating system in accordance with the preferred embodiment of the present invention.
Figure 6:
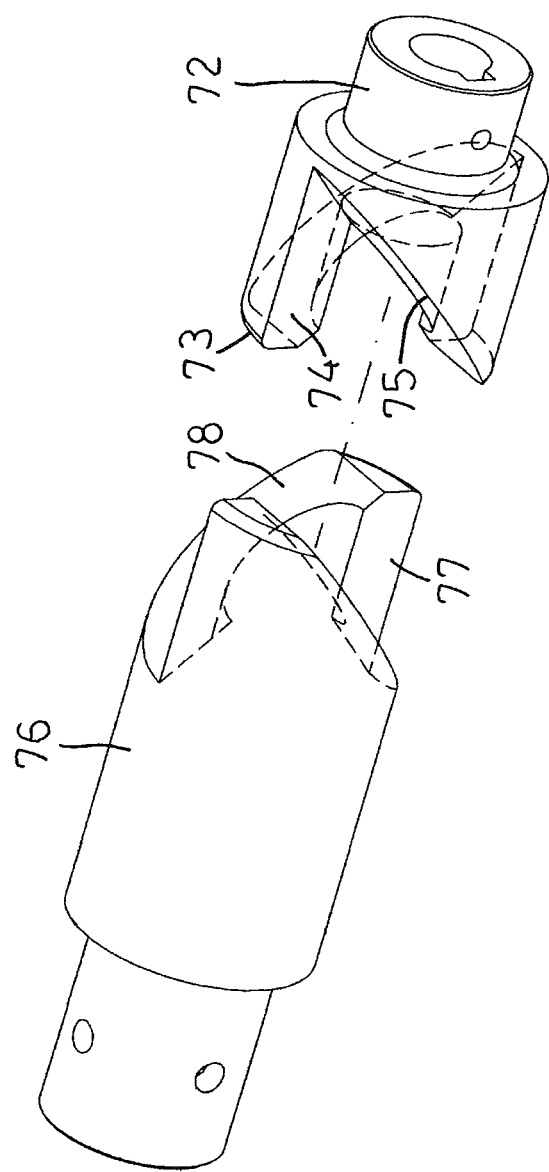
FIG. 6 is a partially exploded perspective view of the automatic torque regulating system in accordance with the preferred embodiment of the present invention.

Referring to the drawings and initially to FIGS. 1-12, an automatic torque regulating system in accordance with the preferred embodiment of the present invention comprises a base 10, a force output shaft 20, a plurality of positioning rods 30, a plurality of spring abutments 33, a plurality of compression springs "S", a first disk 40, a second disk 50, a plurality of driving shafts "L1", a plurality of driven shafts "L2", a plurality of driving gears "G1", a plurality of driven gears "G2", a hollow bushing 43, a plurality of cams 46, a plurality of swing arms 48, a plurality of first tension springs "S1", a plurality of second tension springs "S2", a plurality of swinging members 60, a force input shaft 70, a driven sleeve 72, a driving sleeve 76, and a main drive gear "G".

The base 10 has a substantially L-shaped profile and includes a transverse plate 11 and an upright plate 12. The upright plate 12 has a center provided with a shaft hole 14, and the force output shaft 20 extends through the shaft hole 14 of the base 10. The upright plate 12 has a surface provided with a plurality of screw holes 15 surrounding the shaft hole 14, and the positioning rods 30 are locked onto the screw holes 15 of the base 10. The base 10 further includes two triangular reinforcing plates 13 connected between the transverse plate 11 and the upright plate 12.

The force output shaft 20 is pivotally connected with the shaft hole 14 of the base 10 by a bearing "B" and is retained by a snap ring "C". The force output shaft 20 is provided with a conic face 21 having a diameter gradually decreased from a front end to a rear end thereof. The force output shaft 20 has a first end provided with a force output portion 22 extending through and protruding from the shaft hole 14 of the base 10 and a second end provided with a connecting portion 23.

Each of the positioning rods 30 has a first end provided with a first thread 31 screwed into one of the screw holes 15 of the base 10 and a second end provided with a second thread 32 locked onto the first disk 40 by a nut "N" and a needle bearing "B1". Each of the spring abutments 33 is mounted on one of the positioning rods 30 and rests on the first disk 40. Each of the compression springs "S" is mounted on one of the positioning rods 30 and is biased between one of the spring abutments 33 and one of the positioning rods 30 to push the first disk 40 forward, so that the first disk 40 is moved forward or backward on the positioning rods 30.

The first disk 40 is provided with a plurality of through holes 41 aligning with the screw holes 15 of the base 10, and the positioning rods 30 extend through the through holes 41 of the first disk 40. The first disk 40 has a center provided with a first shaft hole 42 for mounting the hollow bushing 43. The first disk 40 is provided with a plurality of first pivot holes 44 pivotally connected with the driving shafts "L1" by a plurality of bolts "P" and a plurality of washers "Q". The first disk 40 is provided with a plurality of arcuate openings 45 allowing passage of the driven shafts "L2".

The second disk 50 has a center provided with a second shaft hole 51 for mounting the hollow bushing 43. The second disk 50 is provided with a plurality of second pivot holes 52 pivotally connected with the driving shafts "L1". The second disk 50 is provided with a plurality of arcuate slots 53 allowing passage of the driven shafts "L2".

Each of the driving gears "G1" is mounted on one of the driving shafts "L1" by a plurality of bearings "B". Each of the driven gears "G2" is mounted on one of the driven shafts "L2" by a washer "Q", a bearing "B" and a snap ring "C". Each of the driven gears "G2" is locked on one of the driven shafts "L2" by a plurality of bolts "P". Each of the driven gears "G2" meshes with one of the driving gears "G1" respectively.

The hollow bushing 43 is sandwiched between the first disk 40 and the second disk 50 so that the first disk 40, the hollow bushing 43 and the second disk 50 are moved forward and backward simultaneously. The hollow bushing 43 has a front end pivotally connected with the force input shaft 70 by a plurality of bearings "B", and the force input shaft 70 is locked on the front end of the hollow bushing 43 by a bolt "P" and a washer "Q". The hollow bushing 43 has a rear end pivotally connected with the connecting portion 23 of the force output shaft 20 by a bearing "B".

The cams 46 are mounted on the driven shafts "L2" and press the conic face 21 of the force output shaft 20. Each of the cams 46 has a conic face resting on the conic face 21 of the force output shaft 20. The conic face of each of the cams 46 has a diameter gradually increased from a front end to a rear end thereof and has a gradient equal to that of the conic face 21 of the force output shaft 20. Each of the cams 46 is locked onto one of the driven shafts "L2" by a bearing "B" and a bolt "P" so that each of the cams 46 is moved forward and backward with one of the driven shafts "L2". Each of the cams 46 has a side provided with a mounting seat 47 by a plurality of bolts "P". Each of the swing arms 48 is pivotally connected with the mounting seat 47 of one of the cams 46 by a bearing "B" and a snap ring "C". Each of the swing arms 48 has two ends each provided with a pivot hole 49 for mounting a pivot rod "R". The first tension springs "S1" are biased between the swing arms 48 to force the cams 46 to press the conic face 21 of the force output shaft 20, so that the conic face 21 of the force output shaft 20 is sandwiched between the cams 46 by the elastic force of the first tension springs "S1". Each of the first tension springs "S1" has two ends each hooked onto the respective pivot rod "R" of one of the swing arms 48. Each of the second tension springs "S2" is mounted between one of the driving shafts "L1" and one of the driven shafts "L2", so that each of the driven gears "G2" is forced to mesh with one of the driving gears "G1" constantly by the elastic force of each of the second tension springs "S2".

Each of the swinging members 60 is mounted between the first disk 40 and the second disk 50. Each of the swinging members 60 has a first side provided with a first pivot hole 61 allowing passage of one of the driving shafts "L1" and a second side provided with a second pivot hole 62 allowing passage of one of the driven shafts "L2". The second side of each of the swinging members 60 has a first end received in one of the arcuate openings 45 of the first disk 40 and a second end received in one of the arcuate slots 53 of the second disk 50. In such a manner, when the cams 46 are moved forward or backward relative to the force output shaft 20 to change different contact points between the cams 46 and the conic face 21 of the force output shaft 20, each of the driving shafts "L1" functions as a fulcrum, and each of the swinging members 60 drives one of the driven shafts "L2" to pivot about one of the driving shafts "L1" and to swing inward (as shown in FIG. 16) or outward (as shown in FIG. 10) in one of the arcuate openings 45 of the first disk 40 and one of the arcuate slots 53 of the second disk 50, so that the driven gears "G2" also swing in concert with the driven shafts "L2".

Each of the driving shafts "L1" in turn extends through one of the driving gears "G1", one of the second pivot holes 52 of the second disk 50, the first pivot hole 61 of one of the swinging members 60 and one of the first pivot holes 44 of the first disk 40. Each of the driven shafts "L2 in turn extends through one of the driven gears "G2", one of the arcuate slots 53 of the second disk 50, the second pivot hole 62 of one of the swinging members 60, one of the arcuate openings 45 of the first disk 40 and one of the cams 46.

The force input shaft 70 is provided with an elongate channel 71 extending longitudinally. The driven sleeve 72 is secured on the elongate channel 71 of the force input shaft 70 by a bolt "P". The driven sleeve 72 has an exterior provided with two claws 73. The driven sleeve 72 is provided with two first abutting faces 74 and two first guiding ramps 75 between the two claws 73. The driving sleeve 76 is pivotally mounted on the force input shaft 70 by a needle bearing "B1" and is juxtaposed to the driven sleeve 72. The driving sleeve 76 is provided with two second abutting faces 77 aligning with the first abutting faces 74 of the driven sleeve 72 and two second guiding ramps 78 aligning with the first guiding ramps 75 of the driven sleeve 72. The main drive gear "G" is mounted on the force input shaft 70 and meshes with the driving gears "G1" to drive and rotate the driving gears "G1".

In practice, each of the cams 46 is locked onto one of the driven shafts "L2", and each of the driven gears "G2" is locked on one of the driven shafts "L2", so that when the driven gears "G2" are rotated, the driven shafts "L2" and the cams 46 are also rotated in concert with the driven gears "G2". Thus, when the main drive gear "G" is rotated by the force input shaft 70, the main drive gear "G" drives and rotates the driving gears "G1" which drive and rotate the driven gears "G2" which drive and rotate the cams 46 which drive and rotate the force output shaft 20. At this time, when the cams 46 are moved forward or backward relative to the force output shaft 20 to change different contact points between the cams 46 and the conic face 21 of the force output shaft 20, the cams 46 are biased by the elastic force of the first tension springs "S1" and are kept in constant contact with the conic face 21 of the force output shaft 20, while each of the driven gears "G2" is biased by the elastic force of each of the second tension springs "S2" and is kept in constant contact with one of the driving gears "G1".

Figure 12:
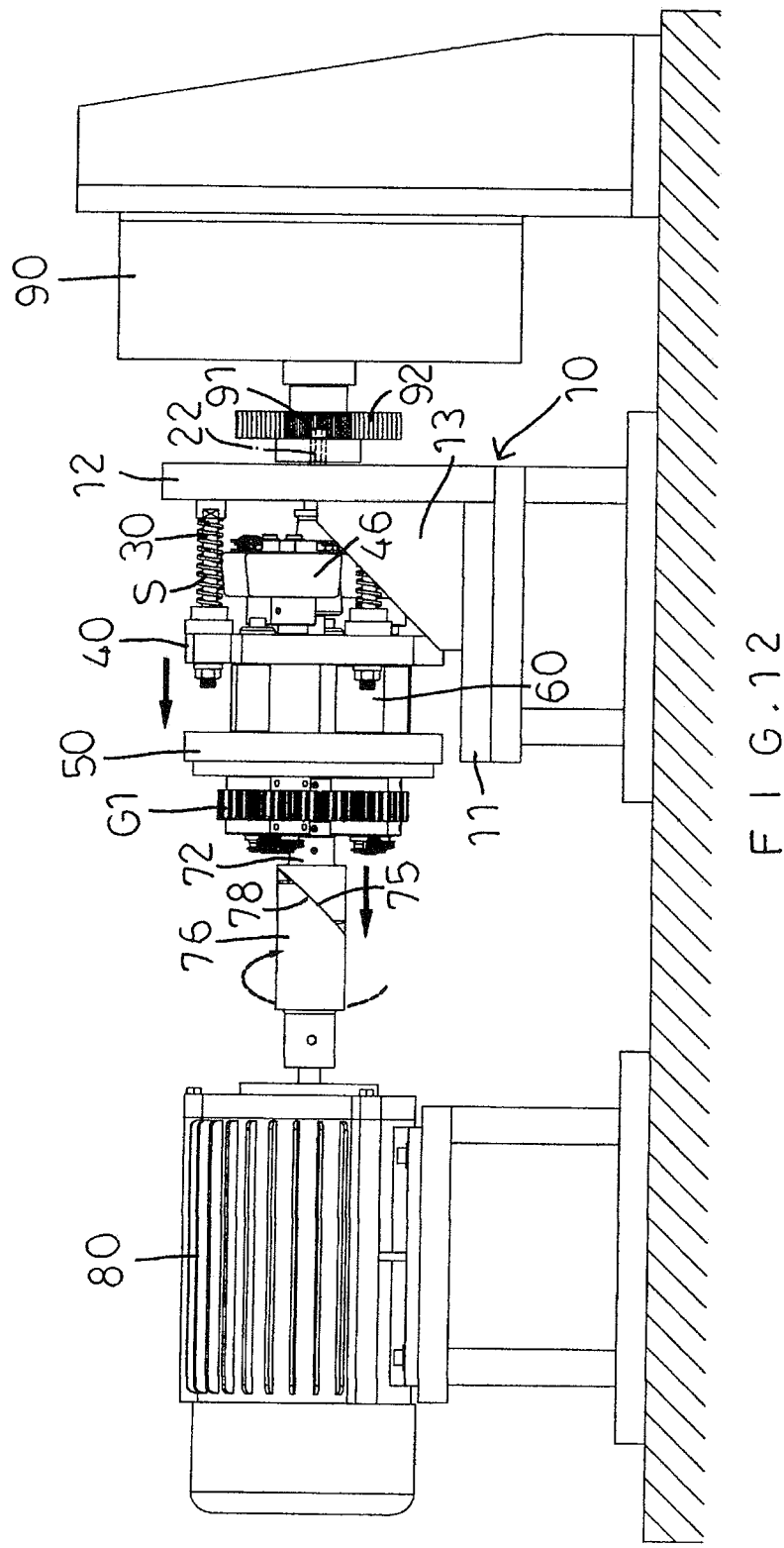
FIG. 12 is a schematic operational view showing the automatic torque regulating system for a generator under the normal load.

In operation, referring to FIGS. 7-12 with reference to FIGS. 1-6, the driving sleeve 76 is connected with a motor 80, and the force output portion 22 of the force output shaft 20 is connected with a generator 90. The generator 90 includes a large gear 92 and a small gear 91. When the generator 90 is operated under the normal load, the first disk 40 and the second disk 50 are pushed and moved forward to a determined position by the elastic force of the compression springs "S", so that the driven sleeve 72 is moved forward and engages the driving sleeve 76 as shown in FIG. 12. In such a manner, the motor 80 applies a power to rotate the driving sleeve 76 which rotates the driven sleeve 72 which rotates the force input shaft 70 which rotates the main drive gear "G" which rotates the driving gears "G1" which rotate the driven gears "G2" which rotate the driven shafts "L2" which rotate the cams 46 which rotate the force output shaft 20 which drives the small gear 91 and the large gear 92 of the generator 90 so as to achieve the purpose of generating electricity.

Figure 13:
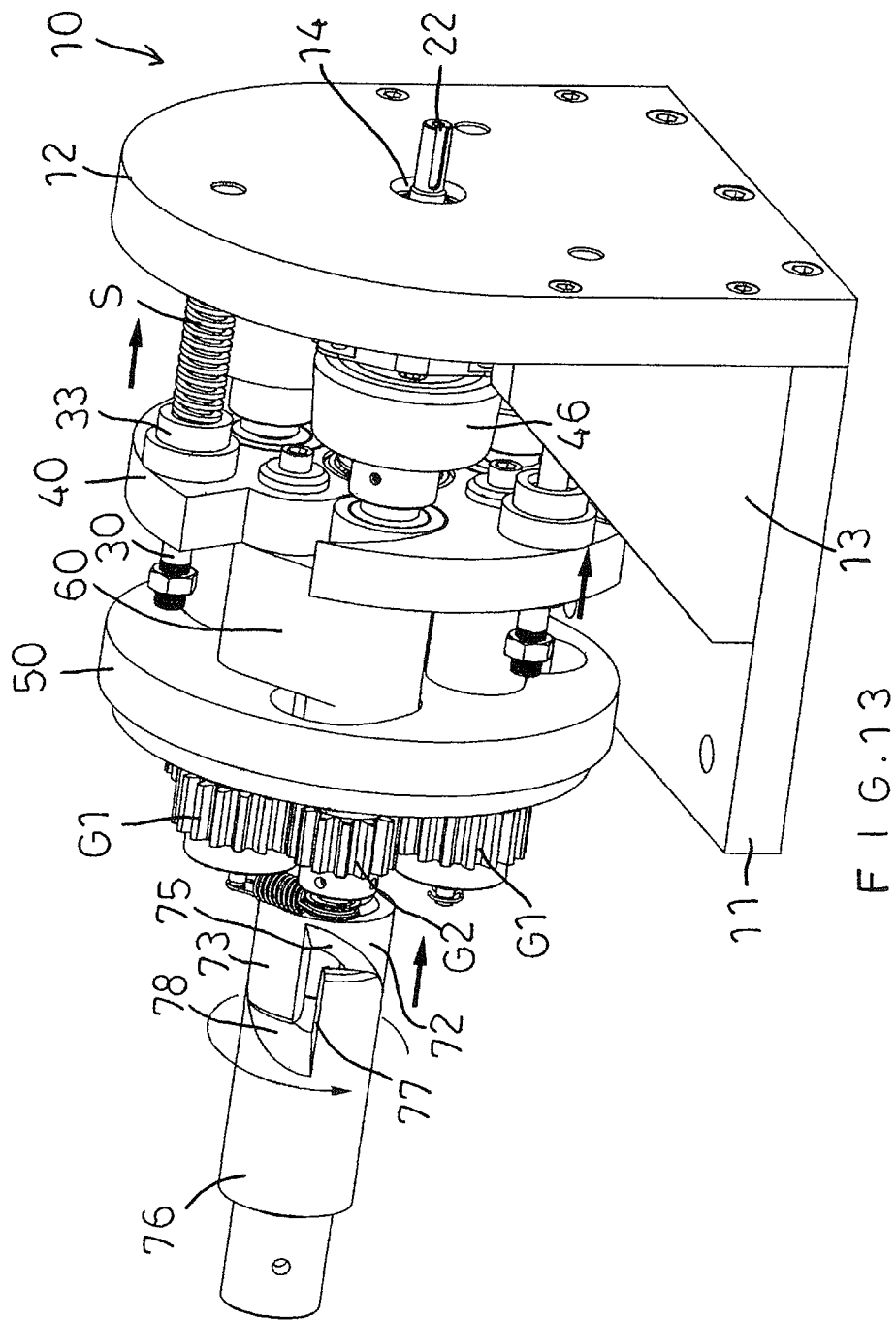
FIG. 13 is a perspective operational view showing the automatic torque regulating system being subjected to a resistance.
Figure 14:
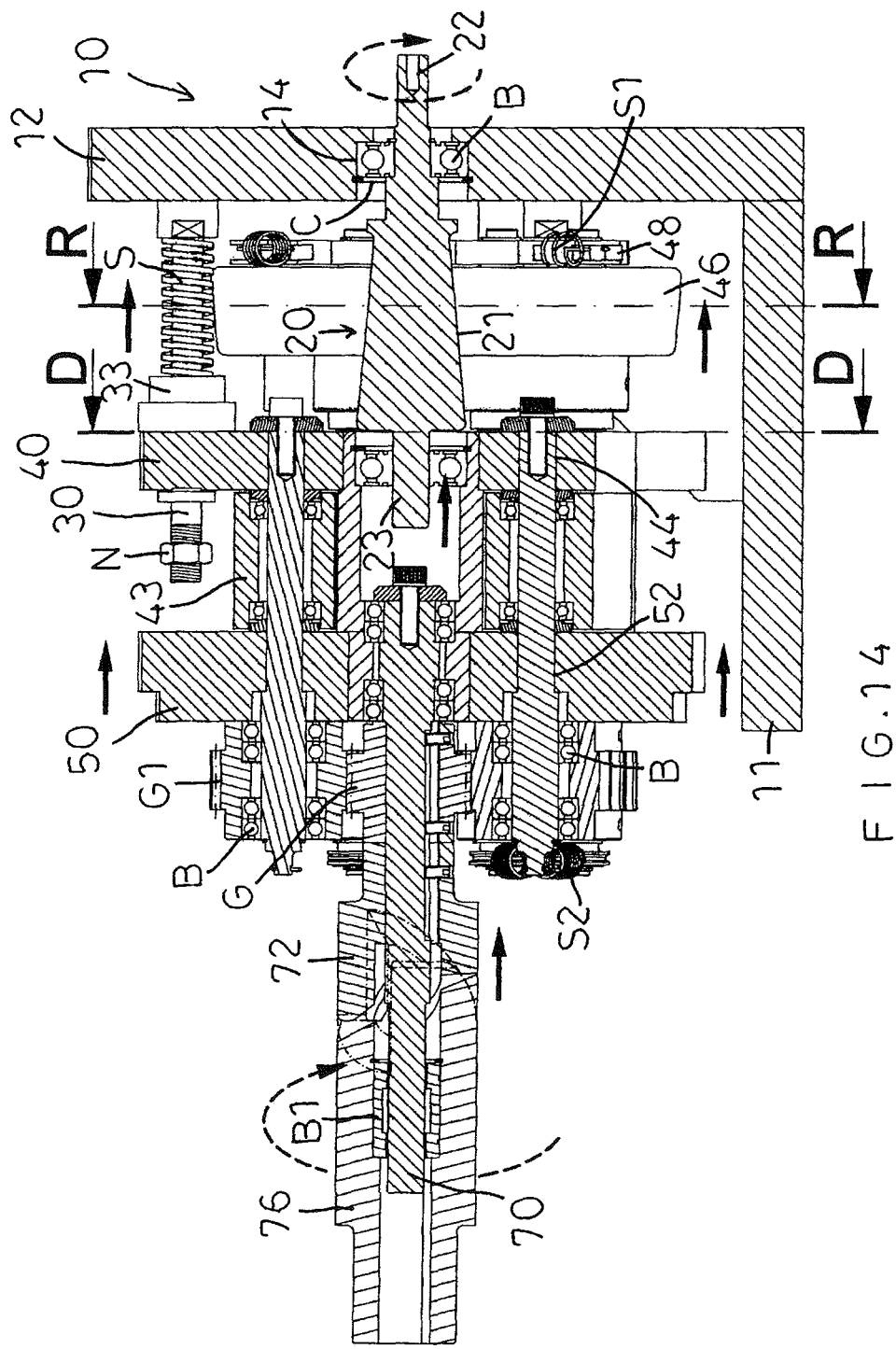
FIG. 14 is a front cross-sectional view of the automatic torque regulating system as shown in FIG. 13.
Figure 17:
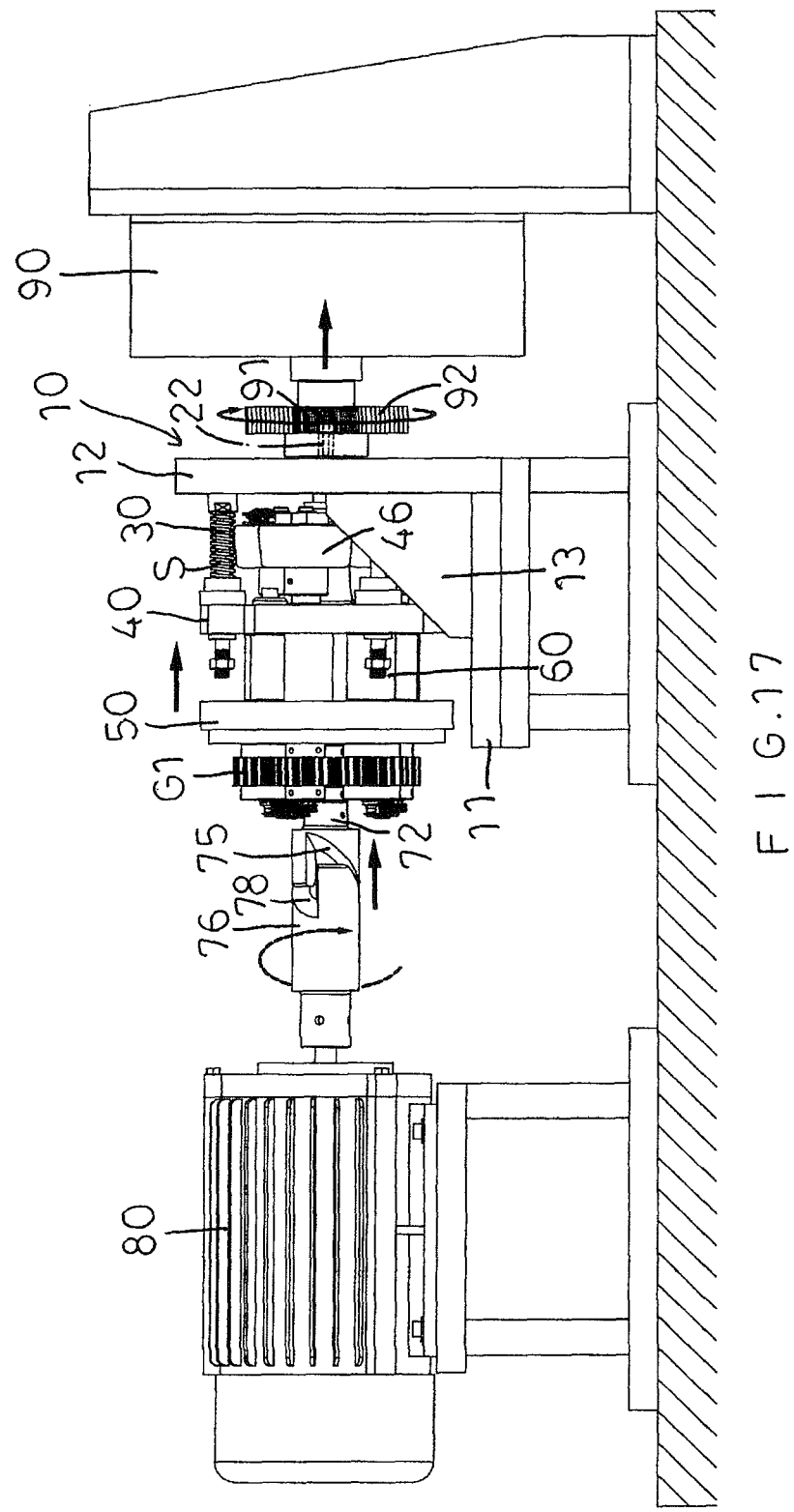
FIG. 17 is a schematic operational view showing the automatic torque regulating system for a generator subjected to a resistance.

On the contrary, referring to FIGS. 13-17 with reference to FIGS. 1-6, when the generator 90 produces a load resistance due to an excessive voltage, the force output shaft 20 stops rotating by the resistance to stop rotation of the force input shaft 70. At this time, the driving sleeve 76 is rotated by the motor 80 successively, and the driven sleeve 72 is pushed backward by a taper fit between the first guiding ramps 75 of the driven sleeve 72 and the second guiding ramps 78 of the driving sleeve 76 as shown in FIG. 13, so that the first disk 40 and the second disk 50 are pushed and moved backward as shown in FIG. 17, and the cams 46 are moved axially relative to the force output shaft 20 from the position as shown in FIG. 8 to the position as shown in FIG. 14, to change different contact points between the cams 46 and the conic face 21 of the force output shaft 20. At the same time, when the cams 46 are moved backward relative to the force output shaft 20 to change different contact points between the cams 46 and the conic face 21 of the force output shaft 20, the cams 46 are biased by the elastic force of the first tension springs "S1" and are kept in constant contact with the conic face 21 of the force output shaft 20, while each of the driven gears "G2" is biased by the elastic force of each of the second tension springs "S2" and is kept in constant contact with one of the driving gears "G1". In such a manner, the cams 46 are moved backward on the force output shaft 20 to enlarge the torque, so that the force output shaft 20 is rotated in concert with the cams 46 simultaneously to drive the small gear 91 and the large gear 92 of the generator 90. Thus, the cams 46 are moved forward or backward relative to the force output shaft 20 to change different contact points between the cams 46 and the conic face 21 of the force output shaft 20, so as to regulate the torque automatically, thereby preventing the generator 90 from being inoperative due to shortage of torque.

In the preferred embodiment of the present invention, the conic face 21 of the force output shaft 20 has a diameter gradually decreased from a front end to a rear end thereof, while the conic face of each of the cams 46 has a diameter gradually increased from a front end to a rear end thereof and has a gradient equal to that of the conic face 21 of the force output shaft 20. In such a manner, when each of the cams 46 is located at the front position of the force output shaft 20, each of the cams 46 applies a smaller torque, and when each of the cams 46 is located at the rear position of the force output shaft 20, each of the cams 46 applies a larger torque. Thus, when the cams 46 are moved backward relative to the force output shaft 20, the torque is enlarged, and when the cams 46 are moved forward relative to the force output shaft 20, the torque is reduced. Therefore, the cams 46 are moved forward or backward relative to the force output shaft 20 to change different contact points between the cams 46 and the conic face 21 of the force output shaft 20, so as to regulate the torque automatically.

Referring to FIG. 18, the force output portion 22 of the force output shaft 20 is connected with an electric car 100. The electric car 100 includes a belt wheel 101 and a belt 102. Thus, the force output portion 22 of the force output shaft 20 uses the belt wheel 101 and the belt 102 to transmit the power of the motor 80 to the electric car 100.

Accordingly, the cams 46 are moved axially relative to the force output shaft 20 to change different contact points between the cams 46 and the conic face 21 of the force output shaft 20, so as to regulate the torque automatically. In addition, the cams 46 are moved relative to the force output shaft 20 to enlarge the torque, thereby preventing the generator 90 or the electric car 100 from being inoperative due to shortage of torque.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. An automatic torque regulating system comprising:
a base, a force output shaft, a plurality of positioning rods, a plurality of spring abutments, a plurality of compression springs, a first disk, a second disk, a plurality of driving shafts, a plurality of driven shafts, a plurality of driving gears, a plurality of driven gears, a hollow bushing, a plurality of cams, a plurality of swing arms, a plurality of first tension springs, a plurality of second tension springs, a plurality of swinging members, a force input shaft, a driven sleeve, a driving sleeve, and a main drive gear;
wherein:
the base includes a transverse plate and an upright plate;
the upright plate has a center provided with a shaft hole, and the force output shaft extends through the shaft hole of the base;
the upright plate has a surface provided with a plurality of screw holes, and the positioning rods are locked into the screw holes of the base;
the force output shaft is pivotally connected with the shaft hole of the base;
the force output shaft is provided with a conic face;
the force output shaft has a first end provided with a force output portion extending through the shaft hole of the base and a second end provided with a connecting portion;
each of the positioning rods has a first end provided with a first thread screwed into one of the screw holes of the base and a second end provided with a second thread locked onto the first disk;
each of the spring abutments is mounted on one of the positioning rods and rests on the first disk;
each of the compression springs is mounted on one of the positioning rods and is biased between one of the spring abutments and one of the positioning rods to push the first disk forward;
the first disk is provided with a plurality of through holes aligning with the screw holes of the base, and the positioning rods extend through the through holes of the first disk;
the first disk has a center provided with a first shaft hole for mounting the hollow bushing;
the first disk is provided with a plurality of first pivot holes pivotally connected with the driving shafts;
the first disk is provided with a plurality of arcuate openings allowing passage of the driven shafts;
the second disk has a center provided with a second shaft hole for mounting the hollow bushing;
the second disk is provided with a plurality of second pivot holes pivotally connected with the driving shafts;
the second disk is provided with a plurality of arcuate slots allowing passage of the driven shafts;
each of the driving gears is mounted on one of the driving shafts;
each of the driven gears is locked on one of the driven shafts and meshes with one of the driving gears respectively;
the hollow bushing is sandwiched between the first disk and the second disk;
the hollow bushing has a front end pivotally connected with the force input shaft and a rear end pivotally connected with the connecting portion of the force output shaft;
each of the cams is locked onto one of the driven shafts and press the conic face of the force output shaft;
each of the cams has a side provided with a mounting seat;
each of the swing arms is pivotally connected with the mounting seat of one of the cams;
the first tension springs are biased between the swing arms to force the cams to press the conic face of the force output shaft, so that the conic face of the force output shaft is sandwiched between the cams by an elastic force of the first tension springs;
each of the second tension springs is mounted between one of the driving shafts and one of the driven shafts, so that each of the driven gears is forced to mesh with one of the driving gears constantly by an elastic force of each of the second tension springs;
each of the swinging members is mounted between the first disk and the second disk;
each of the swinging members has a first side provided with a first pivot hole allowing passage of one of the driving shafts and a second side provided with a second pivot hole allowing passage of one of the driven shafts;
the driven sleeve is secured on the force input shaft and is provided with two first abutting faces and two first guiding ramps;
the driving sleeve is pivotally mounted on the force input shaft and is juxtaposed to the driven sleeve;
the driving sleeve is provided with two second abutting faces aligning with the first abutting faces of the driven sleeve and two second guiding ramps aligning with the first guiding ramps of the driven sleeve; and
the main drive gear is mounted on the force input shaft and meshes with the driving gears.

2. The automatic torque regulating system of claim 1, wherein the base further includes two reinforcing plates connected between the transverse plate and the upright plate.

3. The automatic torque regulating system of claim 1, wherein:
- the conic face of the force output shaft has a diameter gradually decreased from a front end to a rear end thereof;
- each of the cams has a conic face resting on the conic face of the force output shaft; and
- the conic face of each of the cams has a diameter gradually increased from a front end to a rear end thereof and has a gradient equal to that of the conic face of the force output shaft.

4. The automatic torque regulating system of claim 1, wherein the force output portion of the force output shaft is connected with a generator.

5. The automatic torque regulating system of claim 1, wherein the force output portion of the force output shaft is connected with an electric car.

6. The automatic torque regulating system of claim 1, wherein each of the swing arms has two ends each provided with a pivot hole for mounting a pivot rod, and each of the first tension springs has two ends each hooked onto the respective pivot rod of one of the swing arms.

7. The automatic torque regulating system of claim 1, wherein the second side of each of the swinging members has a first end received in one of the arcuate openings of the first disk and a second end received in one of the arcuate slots of the second disk.

* * * * *